United States Patent
Kling, III et al.

(10) Patent No.: US 7,307,737 B1
(45) Date of Patent: Dec. 11, 2007

(54) THREE-DIMENSIONAL (3D) MEASURING WITH MULTIPLE REFERENCE FRAMES

(75) Inventors: Michael J. Kling, III, Little Rock, AR (US); James F. Mashburn, Conway, AR (US); Adam C. Brown, Maumelle, AR (US); Steven W. Rogers, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 427 days.

(21) Appl. No.: 10/960,293

(22) Filed: Oct. 8, 2004

(51) Int. Cl.
*G01B 11/14* (2006.01)

(52) U.S. Cl. .................... 356/614; 356/620

(58) Field of Classification Search ............ 356/614, 356/620, 623
See application file for complete search history.

(56) References Cited

U.S. PATENT DOCUMENTS

| | | | |
|---|---|---|---|
| 5,388,318 A * | 2/1995 | Petta | 29/407.04 |
| 5,440,392 A * | 8/1995 | Pettersen et al. | 356/620 |
| 5,663,795 A * | 9/1997 | Rueb | 356/614 |
| 5,748,505 A * | 5/1998 | Greer | 702/104 |
| 5,973,788 A * | 10/1999 | Pettersen et al. | 356/614 |
| 6,115,927 A | 9/2000 | Hendrix | |
| 6,279,246 B1 * | 8/2001 | van den Bossche | 33/556 |
| 6,611,617 B1 * | 8/2003 | Crampton | 382/154 |
| 6,658,751 B2 | 12/2003 | Jackson et al. | |
| 6,732,030 B2 | 5/2004 | Jones | |
| 6,796,043 B2 * | 9/2004 | Jackson et al. | 33/293 |
| 7,180,607 B2 * | 2/2007 | Kyle et al. | 356/614 |
| 2003/0231793 A1 * | 12/2003 | Crampton | 382/154 |

OTHER PUBLICATIONS

"Tru-Point: Structural Diagnostic System" KJ: Kansas Jack-Brewco, Jun. 2004 Form 5916-1, 2004 Snap-on Incorporated
Young-Hoo Kwon, "DLT Method" <http://kwon3d.com/theory/dlt/dlt.html> pp. 1-15.

* cited by examiner

*Primary Examiner*—Roy M. Punnoose
(74) *Attorney, Agent, or Firm*—McDermott Will & Emery LLP

(57) ABSTRACT

A measurement system processes data representing an images of an optical target, e.g. on a contact probe, to determine position of each of a number of points on a vehicle or other object. The system uses two reference frames and processes an image of the two frames, to define a three-dimensional (3D) coordinate system, for example, in relation to a designated first frame. The image processing determines the position of the other frame in that coordinate system. For any measurement in which the first reference frame is visible in an image with the probe, processing directly determines position of the point in the 3D coordinate system. For any measurement in which that reference frame is not sufficiently visible, but the second reference frame is sufficiently visible, the image processing determines position relative to the second reference frame and transforms that position into a measurement in the defined three-dimensional coordinate system.

37 Claims, 5 Drawing Sheets

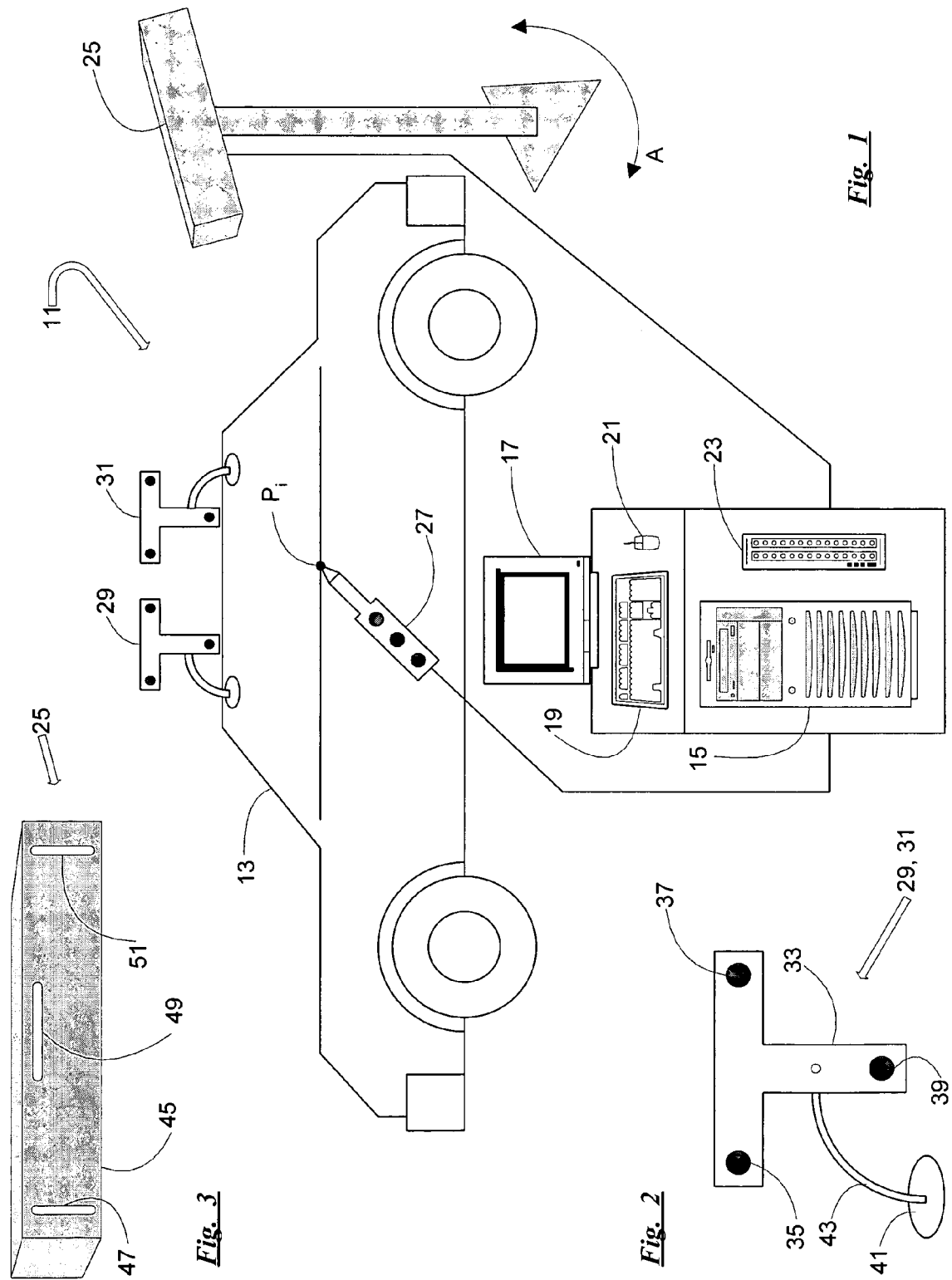

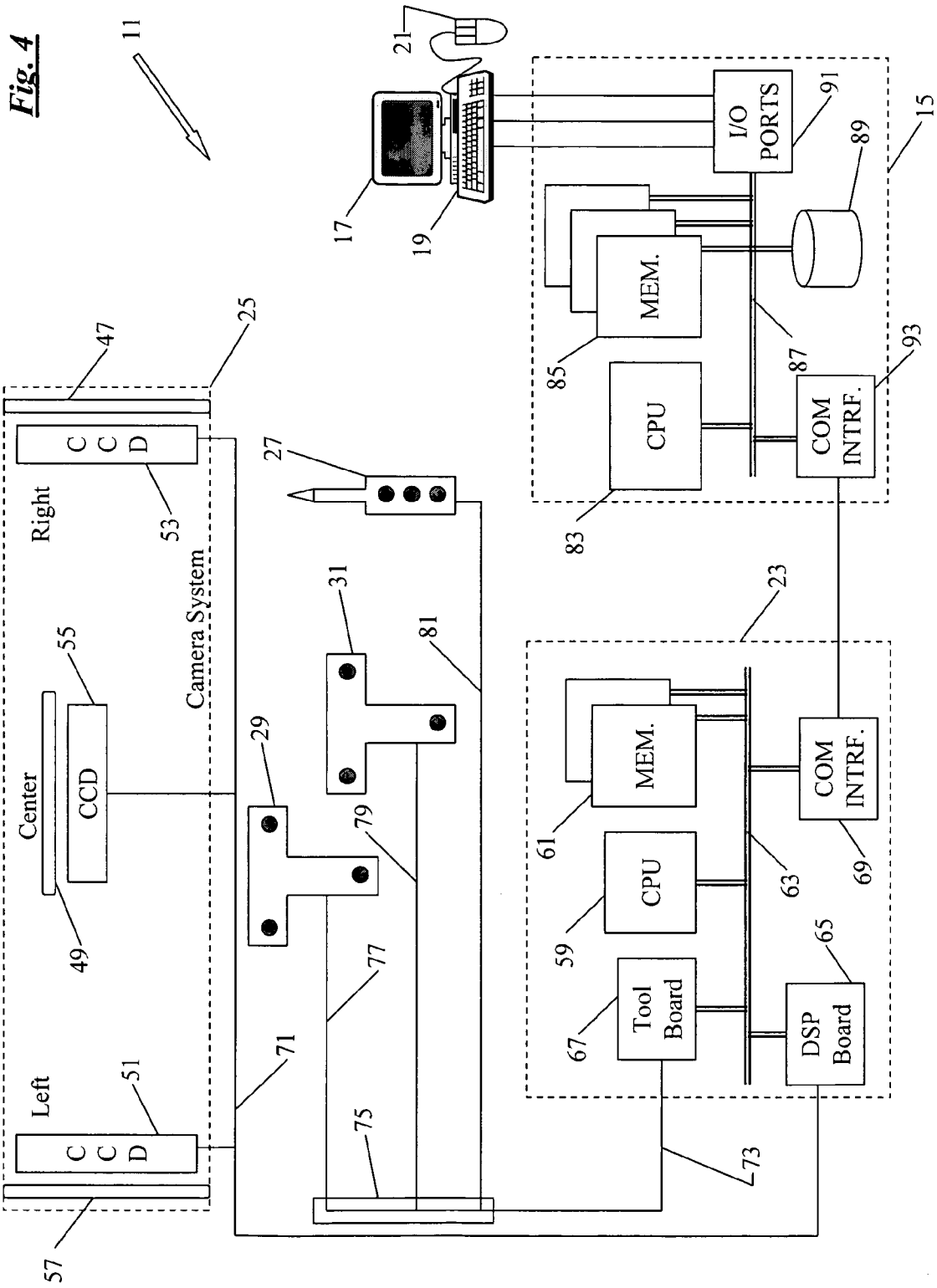

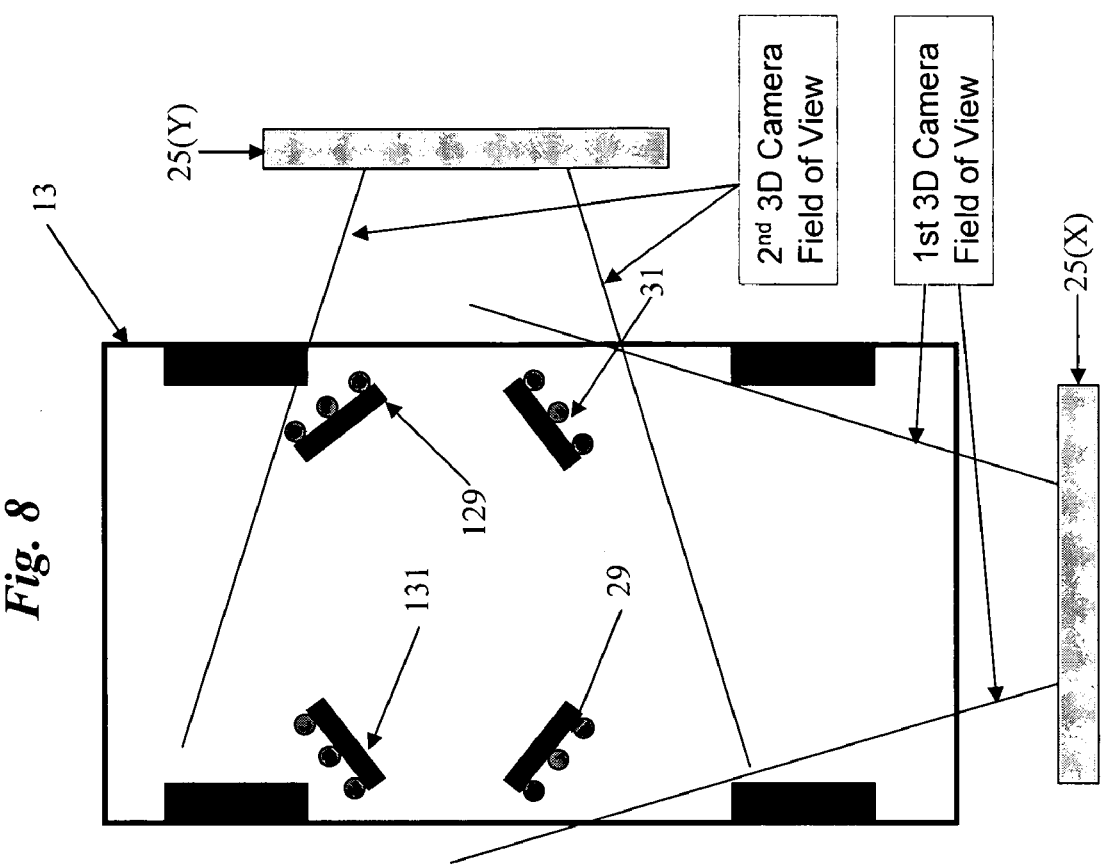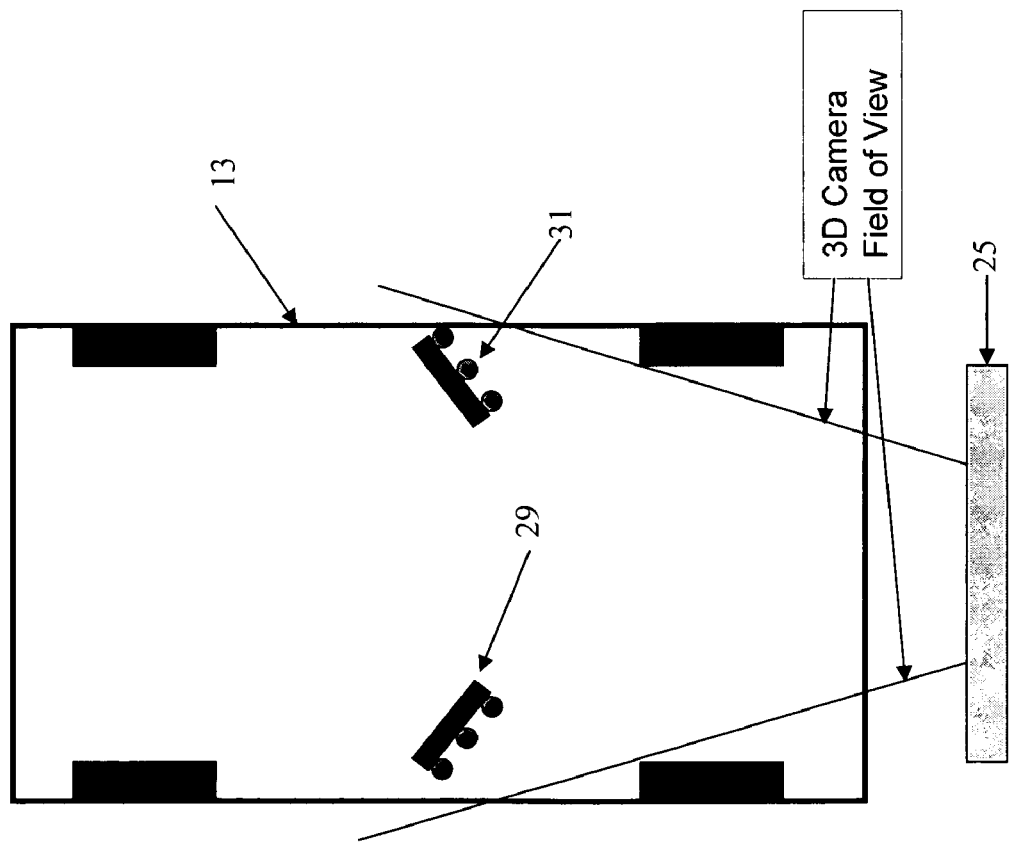

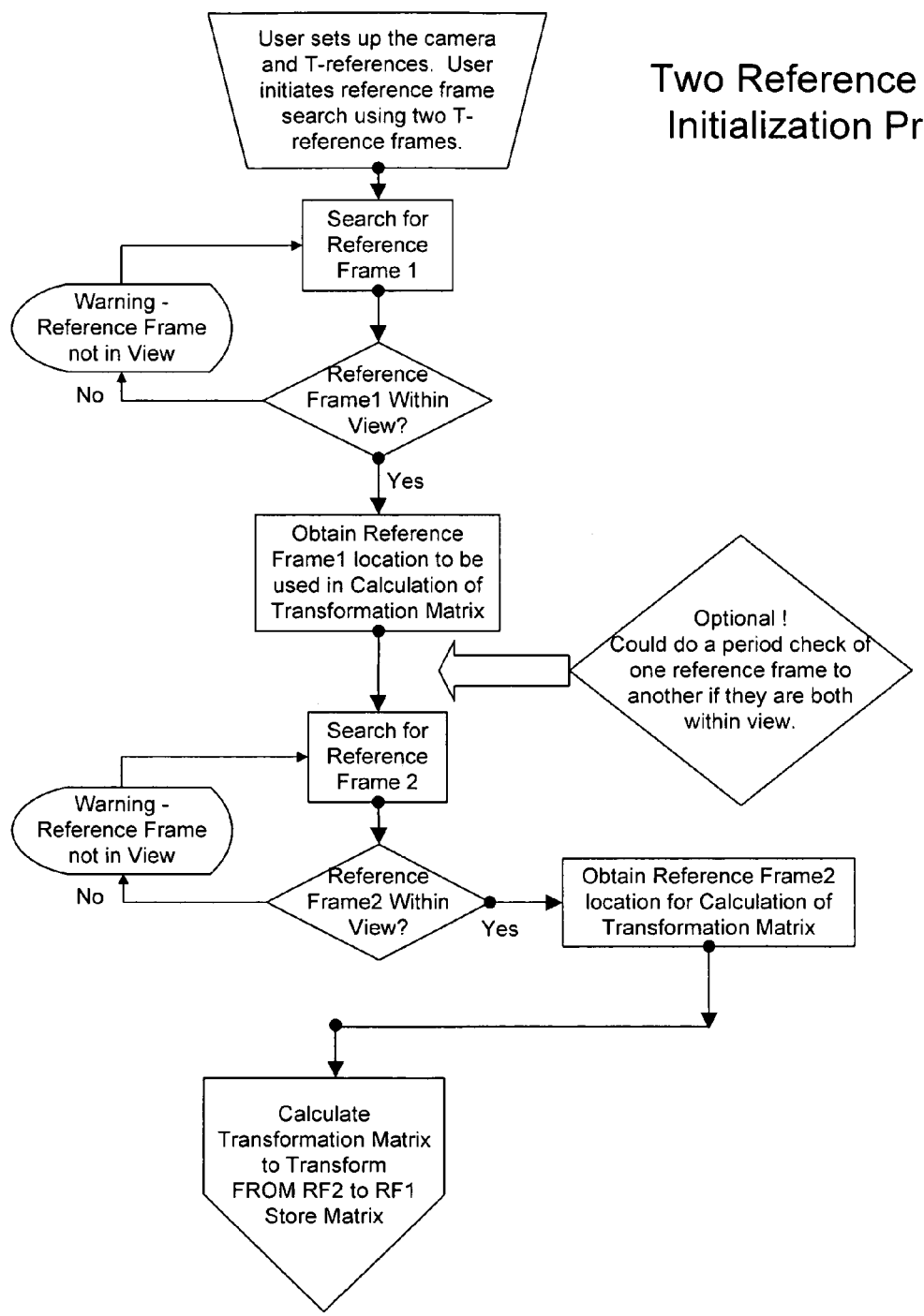

THREE-DIMENSIONAL (3D) MEASURING WITH MULTIPLE REFERENCE FRAMES

TECHNICAL FIELD

The present subject matter relates to techniques and equipment to measure locations of specified points on an object in three-dimensions, for example, points on a vehicle that may be used to analyze damage to the vehicle. More specifically, the present teachings provide improvements in such measurements by utilizing two or more reference frames.

BACKGROUND

In recent years, systems have been developed to measure damage to a vehicle based on images of a probe in contact with specified points on the vehicle. An example of a system using these principles is the Brewco Wolf automotive collision damage measurement system, which is described in U.S. Pat. No. 6,115,927, the disclosure of which is incorporated herein by reference. As described, a camera senses the direction of light from a light emitter on the probe, from three different locations; and a computer triangulates to determine the position of the emitter. A three dimensional coordinate measuring system, like the collision damage measurement system, generally measures locations of points relative to the coordinate system of the measuring device. In a system such as that for damage analysis and repair, it is desirable for the measurements to be in a coordinate system of the item being measured. In some cases, the computer transforms the determined position of the emitter into a standard coordinate system, and that position is compared to standard data for the type of vehicle to determine the extent of deviation of the measured point from the standard data. For collision analysis and repair, for example, this provides data for use in straightening the vehicle or aligning parts of the vehicle, to insure accuracy.

In such image-based analysis systems, the transform to the coordinate system of the measured object generally involves first measuring locations of some reference points on the item being measured. The locations of these references points relative to the coordinate system of the image sensor(s) is used to transform coordinates to a coordinate system of the measured object. If the measuring device moves relative to the measured item it is necessary to re-measure the reference points so that a new transformation formula may be determined.

Adding a reference frame to the measurement system removes the need to re-measure the item reference points when there is a relative movement between the measuring device and the measured item. The reference frame is a device that is mounted in a way that is stationary relative to the item being measured, during the movement of the measuring device. The reference frame is measured continuously by the measuring device. When the reference points on the item being measured are measured, their location is calculated relative to the reference frame's coordinate system. Whenever any subsequent measurement is taken, the location of the reference frame is also measured; and the measured coordinates relative to the camera are transformed into the reference frame coordinate system based on the current reference frame measurement. If desired, the measurement is then transformed into the coordinate system of the object being measured, based on the previously determined fixed relationship between the reference frame coordinate system and the coordinate system of the object being measured. Now the measuring device can be moved relative to the item being measured without affecting measurements in the measured item coordinate system.

In such applications, the reference frame requires at least three points defining a plane. The system described in the U.S. Pat. No. 6,115,927 uses an X-shaped reference frame with clamps for attachment to a vehicle. The reference frame supports four sets of LEDs (light emitting diodes). Each set of LEDs consists of 4 LEDs, with one LED emitting light in each of four orthogonal directions (at 90° angles). Since each LED has a view angle of a little more that ±45°, the X-type reference frame provides visibility of a sufficient number of LEDs for the camera and computer to use it as a reference, from 360° around the subject vehicle. While this does allow for a great deal of freedom to move the camera/sensor system around and measure many points on the vehicle, the reference frame is large and expensive. For example, the relative locations of all of the LEDs must be known to a high precision for this reference frame to function accurately, which mandates machining of the frame to very tight tolerance at a considerable expense.

A low cost device containing at least three LEDs mounted in a plane and disposed in a triangular shape can function as a reference frame. For example, the more recent Tru-Point system from Brewco can utilize a T-shaped frame supporting three LEDs in a plane, as an alternative to the X-shaped reference frame. The data processing system supports both the X-shaped reference frame and the T-shaped reference frame, however, they are not used together. If a wide range of views of the vehicle are desired, the X-shaped reference frame is used. The simpler reference frame has view angle that is limited to a little more the 90° and is used in cases where the wider range is unnecessary. Although this simpler frame is adequate for many applications, sometimes a wider view angle is desired to allow a greater range of movement of the sensor equipment, although the range often need not extend to the full 360° range offered by the X-shaped reference frame.

Hence a need exists for a low cost, simple reference frame system and attendant processing techniques, wherein the reference frame system offers a view angle adequate for a wider range of measurement needs, although it need not always provide as much as 360° total view angle.

SUMMARY

The teachings herein alleviate noted needs for position measurements by offering a relatively simple reference frame system yet providing a reasonably substantial range of views during image based measurements of one or more points on the measured object. In accord with the present teachings, the reference frame system comprises two or more independent reference frames that are utilized in combination.

The teachings are applicable to image-based measurement systems, using optical targets, image sensors and equipment to process images to obtain desired position measurements. Those skilled in the art will recognize, however, that the multiple reference frame teachings are applicable to systems using other types of sensing technologies. In its simplest form, the reference frame system comprises two frames, each supporting three or more targets so as to define a respective reference plane. In the image-based system examples, these reference frames may be as simple as a T-shaped frame with three LEDs as one type of optical target, defining a triangle or intersection of lines representing each plane.

The frames are positioned at separate points on the object being measured and so that the reference planes are at an angle with respect to each other (e.g. with different frame orientations). Initially, both frames are sensed, and the sensing data is processed to define a three-dimensional coordinate system, e.g. relative to a first one of the frames. The position of the second frame in that coordinate system also is determined from the initial image processing. During measurements of positions of points on the object, the imaging or other sensing system may be moved through a relatively large range of angles. The measurements can be taken from the sensing data containing the probe, so long as targets on one or more of the reference frames are included.

In the optical image processing examples, if the first frame is visible, the image processing determines the position of the respective measured point in the three-dimensional coordinate system defined from the first frame, directly. If there is not sufficient visibility of targets on the first frame, but there is sufficient visibility of targets on the second frame, the image processing first determines the position of the respective point relative to the second frame. Then, this positional data is transformed using the determined position of the second frame in relation to the first frame, so as to determine the respective measured position of the point in the three-dimensional coordinate system defined from the first frame.

The technique provides a low cost, simple reference frame system, for example, as simple as two T-shaped frames each supporting as few as three LED type targets. The use of two frames, however, facilitates a relatively wide range of movement of the imaging component(s) during the measurement phase. Further examples discussed below utilize additional reference frames, to further extend the range of movement.

The field of view angle for each exemplary optical target type reference frame is limited to approximately 90°, when readily available LED's are incorporated in the reference frame as the optical targets. Therefore, a two reference frame system provides a view angle for possible camera positions of about 180°, three reference frames provide about 270° of view, and four reference frames can substantially provide a full 360° degree view angle. The type of LED's used as the targets affects the possible view angle of each frame. Using fairly common LEDs with a ±45° illumination angle provides the exemplary 90° view angle for the T-shaped reference frame. Selection of other LEDs with different illumination field characteristics enables the view angle of each individual reference frame to be more or less than 90°.

For example, a method for measuring the position of a point on an object involves receiving a sensing signal regarding targets on two separate reference frames mounted at independent locations on the object. The signal is processed to determine a three-dimensional coordinate system with respect to a first one of the reference frames. The processing also determines a position of the second one of the reference frames in the three-dimensional coordinate system defined with respect to the first reference frame. The method further entails receiving a sensing signal regarding a probe target positioned with regard to the point on the object and of the targets on the second reference frame. The sensing signal regarding the probe target does not include a representation of all of the targets on the first reference frame. This later sensing signal is processed to determine position of the point relative to the second reference frame. The position relative to the second reference frame is transformed into position in the three-dimensional coordinate system, based on the position of the second reference frame in the three-dimensional coordinate system.

In a specific example, a system for analyzing damage at points on a vehicle might include a probe and two reference frames. The probe is for contact with the points on the vehicle to be tested for displacement due to damage of the vehicle. The probe has at least one optically detectable target. A first reference frame comprises three optically detectable targets defining a first reference plane, and a mount for removably attaching the first reference frame to a first location on the vehicle. The second reference frame also comprises three optically detectable targets defining a second reference plane, and a mount for removably attaching the second reference frame. This arrangement allows mounting of the second frame at a second location on the vehicle separate from the first location on the vehicle and independent from mounting of the first reference frame. The system for analyzing damage also includes a three dimensional imaging system, for generating signals representative of images. A programmed computer is responsive to image signals representing images of targets on the reference frames and image signals representing images of the target on the probe when the probe contacts points on the vehicle. The computer processes the image signals to determine positions of the points on the vehicle in a three-dimensional coordinate system defined with respect to at least one of the reference frames as mounted on the vehicle.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

FIG. 1 depicts an image-based measurement system, used in a vehicle collision damage assessment application.

FIG. 2 depicts one of the two reference frames utilized in the system of FIG. 1.

FIG. 3 is an isometric view of the three-dimensional (3D) camera system, utilized in the system of FIG. 1.

FIG. 4 is a functional block diagram of the components of the image-based measurement system.

FIG. 5 is top plan view of a vehicle, two reference frames and the 3D camera system, during coordinate system initialization.

FIG. 7 is a more detailed flow-chart of an exemplary implementation of the initialization phase.

FIG. 8 is a top plan view similar to FIG. 5, which is useful in explaining processing using one or more additional reference frames.

DETAILED DESCRIPTION

Figure 6:
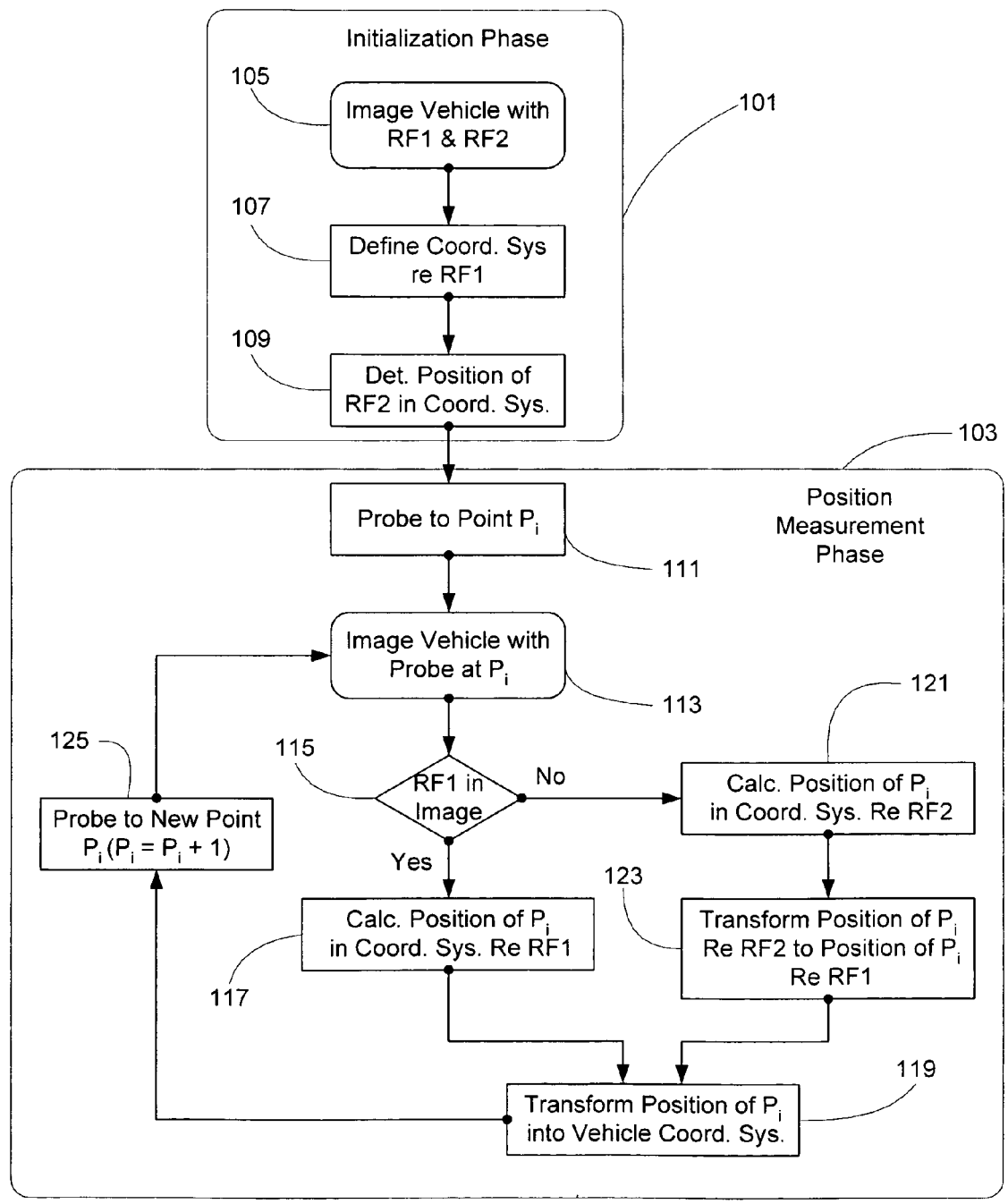
FIG. 6 is a simplified flow diagram, useful in explaining the initialization and measurement processing, using the two reference frames.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various teachings herein relate to techniques for referencing image based position measurements, using two or more target reference frames. The teachings are applicable to a variety of measurement systems and applications thereof. In a vehicle damage assessment application, for example, measured positions on a vehicle are compared to reference data to determine if any of the points are displaced from their desired/original positions. Measurements can be repeated during and/or after repair, to assess efficacy of repair work. To facilitate understanding, it may be helpful to focus on discussion of an exemplary system configured to measure positions of points on a vehicle, for example, as might be used to analyze collision damage or repair thereof on the vehicle.

Reference now is made in detail to the examples illustrated in the accompanying drawings and discussed below. FIG. 1 illustrates an exemplary system 11 for measurement of the position of one or more points on a vehicle 13. The system 11 utilizes a Windows PC (personal computer) 15 that runs the application software, although obviously other computers or data processing devices may be used. The PC 15 provides a user interface, via elements such as the display screen 17, a keyboard 19 and a mouse 21.

The PC 15 connects via a serial port to a black box 23 that controls the three-dimensional (3D) camera system 25 as well as various LED targets on the probe 27 and on the two reference frames 29 and 31. At various stages of operation, the camera system 25 may be moved to various locations about the vehicle, as represented diagrammatically by the arrow A in the drawing. The mounting of the camera system 25 may also allow for adjustment of the height, pan, tilt, etc. of the system 25.

The black box 23 contains a processor, typically a PC104 format embedded PC, a digital signal processor (DSP) board and a tool board. The imaging devices in the 3D camera system are controlled by the DSP board; and the LED's on the probe 27 and the reference frames 29, 31 are driven by the tool board in the black box 23. There is one cable from the black box to the camera and one cable from the black box to a small break out or splitter box shown later in FIG. 4. The reference frame cables plug into the splitter box as does the cable going to the probe 27. In line with the probe cable there is a small box (not separately shown) with switches that are used to initiate a reading or to re-measure a previous point.

The system 11 may utilize a variety of different types of probe. The probe has at least one optical target. Although passive targets could be used, the LED-based probe for the collision measurement application has two or more LEDs as the targets. The exemplary probe 27 also has a desired form of contact tip for contact to points on the vehicle 13. Various contact tips or the like may be used. In some cases, several different types of tips may be used interchangeably on one probe 27. Of note for purposes of this discussion, the configuration of the probe 27 that the system 11 will utilize is known. Specifically, there is a known positional relationship between the contact tip and the LEDs on the probe 27, so that when the probe 27 is in contact with a point $P_i$, there are predetermined relationships between the LED targets on the probe and the point on the vehicle. The application programming of the computer 15 utilizes knowledge of one or more of these relationships of the target LEDs on the probe 27 with respect to the point of contact, in each computation of the position of a point $P_i$ on the vehicle.

Each reference frame supports a plurality of optical targets arranged so as to define a reference plane. Typically, three points are needed to define a plane, so each reference frame has three or more optical targets. The targets may be passive, but in the examples, the targets actively emit radiant energy that is detectable by the particular camera system, e.g. visible light or infrared light. The positions of the targets on each frame also are known. For convenience, two identical reference frames are used. However, it is possible to use frames of different shapes, numbers or types of targets.

FIG. 2 is an enlarged view of an example of one of the two reference frames. As shown, the frame 29 or 31 includes a flat T-shaped member 33, which supports three LEDs. Two LEDs 35 and 37 are mounted near opposite ends of the cross-bar portion of the T-shaped member 33. The LEDs 35 and 37 form two points on a line of the reference plane. The third LED 39 is mounted near the distal end of the other leg of the T-shaped member 33. Another line of the plane runs from the LED 39 to bisect the line formed by the LEDs 35 and 37. The triangular placement of the LEDs 35, 37 and 39 on the T-shaped member 33 therefore is sufficient to define a plane.

To support the reference frame 29 or 31 on the vehicle, the frame also includes a magnetic mount 41 and a flexible support arm 43. The flexible support arm 43 connects to a point on the flat T-shaped member 33. In practice, the technician places the reference frame 29 or 31 by positioning the magnetic mount 41 on a metallic surface of the vehicle 13. The technician can turn the member 33 and support arm 43 about the axis of the mount 41, and the technician can bend the arm 43, to obtain a desired orientation for the particular frame 29 or 31 on the vehicle 31 and thereby orient the plane formed by the LED targets on the reference frame.

Although other 3D imaging systems may be used, the present example utilizes a system 25 (FIG. 3) with three CCD (charge coupled device) cameras. The system 25 comprises a rigid beam 45, shown as a box having elongated slits 47, 49 and 51, providing apertures for the CCD cameras. In the examples, the slits 47 and 51 are vertical, to allow the associated cameras to effectively measure horizontal angles, relative to the camera system 25. The slit 49 is horizontal, so that the associated CCD camera effectively measures vertical angles, relative to the camera system 25. The combination of horizontal and vertical measurements provides 3D measurements relative to the camera system 25. Those skilled in the art will recognize that other numbers, arrangements and orientations of the cameras and slits can be used to enable the imaging for 3D measurements. In the system 11, the cameras measure the spatial position of a target light source, such as an LED. The physical parameters of the LED, system timing and interactions, lenses, focal length, wavelength filtering, etc. are know, from the U.S. Pat. No. 6,115,927 and other teachings, and need not be discussed in detail here.

FIG. 4 is a block diagram, showing the electronics of the system 11, in somewhat more detail. As shown, the camera system 25 includes a CCD camera 53 coupled to form signals representing images of objects observed through the right slit 47. A second CCD camera 55 is coupled to form signals representing images of objects observed through the center slit 49, and a third CCD camera 57 is coupled to form signals representing images of objects observed through the left slit 51. In the system 25, each camera 53, 55 or 57 is essentially a one-dimensional (linear) CCD sensor array.

The black box 23 contains a processor, typically a PC104 format embedded PC. Such a device typically includes a programmable microprocessor or microcontroller serving as the CPU 59, one or more memories 61 and a bus 63 or the like for internal data and instruction communications. The memories 61 typically include a random access memory (RAM) 61 or other dynamic storage device, coupled to the CPU 59, for storing information as used and processed by CPU. The RAM memory also may be used for temporary storage of executable program instructions. The memories 61 also include a program memory, for storing the program for the CPU 59. The program memory typically comprises read only memory (ROM) and/or electrically erasable read only memory (EEROM). The bus 63 also connects to a digital signal processor (DSP) board 65 and a tool board 67. A communication interface 69 enables data communication to/from the host computer, that is to say, to and from the PC 15 in the example.

The CCD cameras in the system 25 connect through a cable 71 to the DSP board 65. The CCD cameras 53, 55 and 57 in the 3D camera system 25 are controlled by the DSP board 65, in response to instructions from the CPU 59. The DSP board 65 also performs initial processing on image data signals received from the CCD cameras; and under control of the CPU 59, the board 65 supplies processed image data via the communication interface 69 to the host PC 15. In the example, 69 is a serial data communication interface.

A first cable 73 runs from the tool board 67 in the black box 23 to a small break out or splitter box 75. The reference frame cables 77 and 79 plug into the splitter box as does the cable 81 going to the probe 27. In line with the probe cable there is a small box (not separately shown) with switches that the technician operates, for example, to initiate a reading or to re-measure a previous point. The tool board 67 in the black box 23 includes LED driver circuits and circuitry for detecting user activations of the switches. In response to commands from the CPU 59, the tool board activates the various LEDs on the reference frames and the probe, to facilitate imaging thereof by the CCD cameras.

The reference frame that will serve as the first frame may be selected by plugging the cable 77 or 79 into a connector on the splitter box 75 designated for the first reference frame. In another example, the software of the computer 15 may allow the user to select one of the two (or more) T-shaped reference frames for use as the first frame. In the later case, the software will automatically search images for the designated first reference frame, regardless of the connection to the splitter box 75. The user provides feedback when the placement is complete, via the Vehicle Measurement software graphical user interface (GUI) provided by the software and the input output elements of the PC.

In the example, the PC 104 in the black box 23 calculates position relative to the camera and transforms positions into coordinates relative to the reference frames. If transformation to car coordinates also is desired, that additional transform, is performed in the host PC 15. Of course the transformations could be implemented entirely in the PC 104, or all of the processing could be done in the host computer 15.

It is assumed that those skilled in the art are generally familiar with the structure and operation of PC or workstation type implementations of the host computer system 15. However for some readers, it may be helpful here to consider a brief summary explanation. The host PC runs an application program to control the system elements, process data, compute coordinates and provide user input output capabilities. The system 15 may run a number of other programs that are useful to the mechanic, technician and/or other personnel in the auto body shop.

The exemplary computer system 15 contains a central processing unit (CPU) 83 memories 85 and an interconnect bus 87. The CPU 83 may contain a single microprocessor, or may contain a plurality of microprocessors for configuring the computer system 15 as a multiprocessor system. The memories 85 include a main memory, a read only memory, and mass storage devices such as various disk drives, tape drives, etc. The main memory typically includes dynamic random access memory (DRAM) and high-speed cache memory. In operation the main memory stores at least portions of instructions and data for execution by the CPU 83. The mass storage may include one or more magnetic disk or tape drives or optical disk drives, for storing data and instructions for use by CPU 83. For a PC type implementation, for example, at least one mass storage system 89 in the form of a disk drive or tape drive, stores the operating system and application software as well as data. The mass storage 89 within the computer system 15 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 15. Of note for purposes of the present discussion, a hard disk drive such as mass storage drive 89, stores the operating system and the program for implementation of the collision data measurement processing as well as measurement results and standard vehicle data used for comparative analysis.

The system 15 also includes one or more input/output interfaces for communications, shown by way of example as an interface 93 for data communications. For purposes of the position measurement and damage assessment application, the interface 93 provides two-way data communications with the black box 23. In an example of the system 11, the PC 15 connects via a serial port to the similar interface 69 in the black box 23. Those skilled in the art will recognize that other communications interface may be used, such as a USB hub providing three or more ports for USB cable links to the black box and/or to other elements associated with or controlled by the PC 15.

Although not shown another communication interface may provide communication via a network, if desired. Such an additional interface may be a modem, an Ethernet card or any other appropriate data communications device.

The physical links to and from the communication interface(s) may be optical, wired, or wireless. In the example, the link to the black box as well as the links to the camera system, the reference frames and the probe all utilize cables. However, infrared, RF, and broadband wireless technologies may be used for any or all of these links. Any external communications may use hard wiring or wireless technologies.

The computer system 15 may further include appropriate input/output ports 91 for interconnection with the display 17, the keyboard 19 and the mouse 21 serving as the respective user interface. For example, the computer may include a graphics subsystem to drive the output display 17. The output display 17 may include a cathode ray tube (CRT) display, plasma screen or liquid crystal display (LCD). Although not shown, the PC type system 15 typically would include a port for connection to a printer. The input control devices for such an implementation of the system 15 would include the keyboard 19 for inputting alphanumeric and other key information. The input control devices for the system 15 further include a cursor control device such as the mouse 21 or a touchpad, a trackball, a stylus, or cursor direction keys. The links of the peripherals 17, 19, 21 and the like to the system 15 may be wired connections or use wireless communications.

The computer system 15 typically runs an operating system and a variety of applications programs, and the system stores data. Programmed operations of the system enable one or more interactions via the user interface, provided through elements such as 17, 19 and 21, and implement the desired image processing and associated position measurements. For the position measurements, the programming enables the computer 15 to process the image data to determine positions of reference frames relative to the camera system 25 and to transform that information into one or more 3D coordinate systems and to process data regarding the probe location into position measurement data in one of the 3D coordinate systems. The host 15 will typically run an application or shell specifically adapted to provide the user interface for input and output of desired information for position measurements and related collision assessment services. As noted, because it is a general purpose system, the device 15 may run one or more of a wide range of other desirable application programs, some of which may involve machine vision but many of which may not.

The components contained in the computer systems 15 are those typically found in general purpose computer systems used as servers, workstations, personal computers, network terminals, and the like. In fact, these components are intended to represent a broad category of such computer components that are well known in the art.

At various times, the relevant programming for the position measurements and associated processing may reside on one or more of several different media. For example, relevant portions of the programming may be stored on a hard disk 89 and loaded into RAM in main memory 85 for execution. Programming for the black box is stored in non-volatile memory, although some instructions may be uploaded to RAM for execution. The programming also may reside on or be transported by other media for uploading into the system 15 and/or the black box 23, to essentially install the programming. Hence, at different times all or portions of the executable code or data for any or all of the software elements may reside in physical media or be carried by electromagnetic media or be transported via a variety of different media to program the particular system 15, 23.

As used herein, terms such as computer or machine "readable medium" therefore refer to any medium that participates in providing instructions to a processor for execution or providing data for processing. Such a medium may take many forms, including but not limited to, non-volatile media, volatile media, and transmission media. Non-volatile media include, for example, EEROM or flash memory or optical or magnetic disks, such as any of the storage devices in the computer 15 of FIG. 4. Volatile media include dynamic memory, such as main memory. Physical transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications.

Having discussed an example of a system, we will now consider examples of the operational procedures, for position measurements, such as measurement of locations or positions of data points on a vehicle, in a collision damage analysis. First, consider an overall procedure for using the system 11 to optically measure locations of points P on the vehicle 13, when contacted by the probe 27.

The overall measurement begins with mounting of the reference frames. A first reference frame 29 is mounted at a first location and with a first orientation on the object, that is to say on the vehicle 13 in our example. A second reference frame 31 is mounted at a second location and with a second orientation on the object vehicle 13. Each reference frame 29, 31 supports at least three optical targets so as to define a respective reference plane. In the example, each reference frame supports three LEDs in a planar T-shaped arrangement (see FIG. 2). The location and orientation of the second reference frame 31 are substantially independent of the location and orientation of the first reference frame 29.

The second reference plane is at an angle with respect to the first reference plane. FIG. 5 shows an example of the mounting of the reference frames 29, 31 on a vehicle 13. In the example, the planes of the two reference frames are at an angle roughly around 90° with respect to each other. As so mounted on the vehicle, the two reference frames are within the field of view of the 3D camera system 25 during initialization (see FIG. 5). With two reference frames positioned approximately as shown, the system allows for up to about 180° of view when there are no physical obstructions. Hence, during the subsequent position measurements, the camera system can be moved approximately 90° to the right or approximately 90° to the left around the vehicle 13, from the initialization position shown in FIG. 5. Throughout this range of camera system movement, the system 11 can image the probe targets and one or more of the reference frames 29, 31, and process the image data to determine the position(s) of probe contact points on the vehicle 13 in the coordinate system defined with respect to the first reference frame. If desired, the coordinates can be transformed to coordinates in a system defined in a known relationship to the vehicle 13.

FIG. 6 provides a flow diagram of a high level diagram of the processing to take position measurements, once the reference frames are mounted as shown in FIG. 5. The process comprises an initialization phase 101 and a position measurement phase 103. The system 11 will initially prompt the user to set the two reference frames within simultaneous view of the camera system. At step 105, the technician activates the system 11 to image the vehicle with the two reference frames. In the arrangement shown, one of the reference frames 29 serves as RF1, and the other frame 31 is designated RF2. The host system 15 processes the initial image data (in step 107) to define a three-dimensional coordinate system, with respect to RF1 (29). This essentially entails computing a transform matrix for transformation of measurements computed in relation to the camera system 25 based on detected position of the reference plane of the frame 29. At step 109, the computer system 15 also determines the position of reference frame RF2 (31) in the defined three-dimensional coordinate system. The relative position data may take the form of a transform matrix. In an example discussed later, the position data represents the position of a centroid of the reference frame RF2 (31) in the coordinate system. The position data computed for that frame essentially allows conversion of later point measurements taken relative to reference frame RF2 (31) into the three-dimensional coordinate system defined by the location and orientation of reference frame RF1 (29).

In the measurement phase (103), the technician contacts the tip of the probe 27 to a first designated point $P_i$, so that the optical targets on the probe have a known relationship to the initial point on the object (step 111). The technician triggers a measurement button on the probe 27, and in response, the computer 15 and the black box 23 activate the various LED targets and the camera system 25 to image the reference frame(s) and the probe in contact with the initial point $P_i$ (step 113). The image signals from the CCD cameras in the system 25 are supplied to the black box 23 for initial processing, and the black box 23 forwards the pre-processed image data to the host computer 15, for further processing.

The camera system 25 may be at the position used for imaging in the initialization phase, or the technician may have moved the camera system 25 to another location/orientation for convenient viewing of the particular point of interest on the vehicle 13. At step 115, the host computer 15 searches the processed image data to determine if enough of the targets on the reference frame RF1 (29 in our example) are present in the imaged field of view. Is so (Yes), then processing branches at 115 to step 117, in which the computer 15 processes the image to calculate the position of point $P_i$ in the defined 3D coordinate system. Essentially, for a measurement of position of a point $P_i$, in which three optical targets of the RF1 reference frame (29) are visible in the image, the processing at 115 and 117 serves to directly determine the position of the point $P_i$ in the three-dimensional coordinate system defined in relation to that reference frame.

If desired, this measurement from step 117 can be transformed at step 119 to a coordinate system defined in relationship to the vehicle (note that steps for initializing the system to perform this added transformation are omitted from the simple processing example, for ease of illustration and discussion). Also, the measurement data for the point may be compared to standard measurement data, for the particular make and model of the vehicle 13, as a tool to assess a deviation due to damage or wear.

Returning to step 115 where the computer 15 searches for the RF1 frame, if the search indicates that that frame is not sufficiently within the present field of view of the image, then processing branches from 115 to step 121. The computer 15 searches for an image of the second reference frame RF2 (31 in our example), and for purposes of this discussion, it is assumed that the image of that frame is observed in the image data. Hence, at step 121, the computer processes the image data to determine the position of the second point relative to the second reference frame. The computer for example may be capable of calculating a coordinate system on the fly from the data for the targets of RF2 and transforming image data regarding the position of the probe in the system to the relationship of the probe tip and thus the point $P_i$ to the frame RF2. The computer then uses the relationship of RF2 to the RF1 coordinate system determined in step 109 to transform the position of the point $P_i$ into a positional measurement for that second point in the three-dimensional coordinate system defined with respect to RF1.

In the illustrated process example, either the step 117 or the step 123 produced measurement data for the designated point $P_i$ with respect to the three-dimensional coordinate system defined with respect to RF1, and that data was transformed at step 119 to a coordinate system defined in relationship to the vehicle (note that steps for initializing the system to perform this added transformation are omitted from the simple processing example, for ease of illustration and discussion). Again, the measured coordinate data for location of the point $P_i$ may be compared to reference data, to allow assessment of deviation from the norm.

Upon completion of the measurement processing at step 119, the technician may initiate processing for a new point on the vehicle. Accordingly, at step 125, the user places the probe 27 at a new point ($P_i=P_i+1$) and activates the imaging for the new point at step 113. In this way, the image processing and measurement processing repeats through steps 113 to 125 for as many points as the technician needs to measure.

In the example of FIG. 6, the computer 15 processes the image data of the optical probe target when contacted to each of the points on the vehicle to determine a position of each of the points. For a measurement any of the points, in which the first reference frame is visible in the image, the processing directly determines position of the point in the three-dimensional coordinate system defined in relation to the designated first reference frame. For any measurement in which the first reference frame is not visible, the processing of the respective image data determines position of the point relative to the second reference frame and transforms that position into position of the respective point in the three-dimensional coordinate system defined in relation to the designated first reference frame.

To insure a full understanding of at least one implementation, it may be helpful now to consider an example of the mathematics involved in processing of the image data for collision assessment, although of course, other processing algorithms may be used. In the example, the system 11 outputs X,Y,Z values in millimeters. These values are referenced to a Calibration fixture (not shown) used to initially calibrate the system 11 and as such relate to positional measurements in relation to the 3D imaging camera system 25. As will be shown later, these X,Y,Z values can be transformed to different coordinate systems of the reference frames and can be similarly transformed into a coordinate system of the vehicle itself.

The calibration process is the exclusive determination of how X,Y,Z values are formulated. No physical characteristics of the system are directly used in X,Y,Z calculations (they are indirectly correlated through the calibration process). Because of this, the relative 3D spatial positions of the calibration points must be known with a high degree of accuracy. Also, any physical changes to the camera assembly will require re-calibration.

The basis of the calibration process is derived from the Direct Linear Transform (DLT) which uses 11 parameters to perform the mapping from the object space to a known reference frame. Calibration will relate the centroid readings from a particular camera to the XYZ positions of the calibration fixture, and these XYZ values can be transformed to a different reference frame. A detailed explanation of a DLT (Discrete Linear Transformation) method applied to a 2D CCD array is given by Kwon (http://kwon3d.com/theory/dlt/dlt.html). Kwon's form for a 2D array gives:

$$CameraCentroid, U - \text{direction} = \frac{L_1 X + L_2 Y + L_3 Z + L_4}{L_9 X + L_{10} Y + L_{11} Z + 1} = u \quad (1)$$

The camera system 25, however, uses three linear (1D) sensor arrays for the cameras. The equation used for the system 25 is given in equation 2 below. This equation relates the centroid values of a particular camera (one CCD linear array) 53,55 or 57 to the 7 coefficients and the known XYZ values as:

$$CameraCentroid = \frac{L_1 X + L_2 Y + L_3 Z + L_4}{L_5 X + L_6 Y + Z + L_7} = C \quad (2)$$

where:

Camera Centroid (C) is the measured value from the CCD camera, for a particular camera; and $L_1 \ldots L_7$ are the coefficients that relate the physical parameters of the system to the location (XYZ) of the measured point.

Reducing Equation 2 to apply the 7 Coefficients to Physical parameters for a linear array provides:

$$L_1^1 X_1 + L_2^1 Y_1 + L_3^1 Z_1 + L_4^1 - C^1 L_5^1 X_1 - C^1 L_6^1 Y_1 - C^1 L_7^1 = C^1 Z_1 \quad (3)$$

This formulation allows isolation of the 7 coefficients so that they can be computed. Note that equation 3 is for a particular camera (denoted by the Superscript, C1) for a particular set of [XYZ]'s (denoted by the subscripts, [X1 Y1 Z1]). This is not to be confused with the subscripts on the coefficients, L11 . . . L17, which denote the coefficient number. The superscripts on the coefficients associate them with the camera. If readings are taken for multiple locations (for example across the fixture depicted in FIG. 3), the expanded matrix form of Equation 3 becomes:

$$\begin{bmatrix} X_1 & Y_1 & Z_1 & 1 & -C_1^1 X_1 & -C_1^1 Y_1 & -C_1^1 \\ X_2 & Y_2 & Z_2 & 1 & -C_2^1 X_2 & -C_2^1 Y_2 & -C_2^1 \\ \vdots & \vdots & \vdots & \vdots & \vdots & \vdots & \vdots \\ X_M & Y_M & Z_M & 1 & -C_M^1 X_M & -C_M^1 Y_M & -C_M^1 \end{bmatrix} \begin{bmatrix} L_1^1 \\ L_2^1 \\ L_3^1 \\ L_4^1 \\ L_5^1 \\ L_6^1 \\ L_7^1 \end{bmatrix} = \begin{bmatrix} C_1^1 Z_1 \\ C_2^1 Z_2 \\ \vdots \\ C_M^1 Z_M \end{bmatrix} \quad (4)$$

Equation 4 represents the Calibration Coefficient Matrix Form, where each row of the first matrix is for a specific measurement location from the calibration fixture. The subscripts designate values for a measurement location. For instance C12 is the camera 1 centroid value at location two (i.e. at X2,Y2,Z2). This is a basic over-determined system of the form: AL=B, where:

$$A = \begin{bmatrix} X_1 & Y_1 & Z_1 & 1 & -C_1^1 X_1 & -C_1^1 Y_1 & -C_1^1 \\ X_2 & Y_2 & Z_2 & 1 & -C_2^1 X_2 & -C_2^1 Y_2 & -C_2^1 \\ \vdots & \vdots & \vdots & \vdots & \vdots & \vdots & \vdots \\ X_M & Y_M & Z_M & 1 & -C_M^1 X_M & -C_M^1 Y_M & -C_M^1 \end{bmatrix}, \quad (5)$$

-continued $$x = \begin{bmatrix} L_1^1 \\ L_2^1 \\ L_3^1 \\ L_4^1 \\ L_5^1 \\ L_6^1 \\ L_7^1 \end{bmatrix} \text{ and } B = \begin{bmatrix} C_1^1 Z_1 \\ C_2^1 Z_2 \\ \vdots \\ C_M^1 Z_M \end{bmatrix}$$

If the statistics of the measurement errors have a near normal distribution, a least squares solution of Equation 4 for the calibration coefficients, L1 . . . L7 will give optimum results. Experiments of results using this method to solve for coefficients have shown the distribution of errors to be near normal. Also, the distribution of centroid values for a fixed system shows a near normal shape. The least squared manipulation yields:

AL=B $(A^T A)L = A^T B$ $$(A^T A)^{-1}(A^T A)L = (A^T A)^{-1} A^T B \quad (6)$$

$L = (A^T A)^{-1} A^T B$ = Vector of calibration coefficients for the CCD camera under calibration.

These calibration coefficients are only for the single CCD camera from which they were derived. A separate set of 7 coefficients must be derived for each camera 53, 55 or 57. As mentioned, if the physical arrangement (i.e. the mounting) of the camera changes with relation to the other cameras in the system, new coefficients must be computed.

Once coefficients for a system 25 have been computed and stored (a system consisting of three cameras with three sets of coefficients for each camera), XYZ values can be computed based on the three centroid values for a particular location. Note that the output XYZ values will be in reference to the calibration frame (i.e. fixture) that was used to generate the coefficients for the particular camera system 25. However, it is possible to transform such measurements into coordinates in any arbitrary system.

Equation 3 is rearranged below as Equation $$L_1^1 X_1 + L_2^1 Y_1 + L_3^1 Z_1 + L_4^1 - C^1 L_5^1 X_1 - C^1 L_6^1 Y_1 - C^1 L_7^1 - C^1 Z_1 = 0 \quad (7)$$

Equation 7 represents application of 7 coefficients to physical parameters. This will allow the matrix form:

$$\begin{bmatrix} (L_1^1 - C^1 L_5^1) & (L_2^1 - C^1 L_6^1) & (L_3^1 - C^1) \\ (L_1^2 - C^2 L_5^2) & (L_2^2 - C^2 L_6^2) & (L_3^2 - C^2) \\ (L_1^3 - C^3 L_5^3) & (L_2^3 - C^3 L_6^3) & (L_3^3 - C^3) \end{bmatrix} \begin{bmatrix} X \\ Y \\ Z \end{bmatrix} = \begin{bmatrix} (C^1 L_7^1 - L_4^1) \\ (C^2 L_7^2 - L_4^2) \\ (C^3 L_7^3 - L_4^3) \end{bmatrix} \quad (8)$$

Equation 8 represents the matrix form for equations relating XYZ and 3 camera centroids, where the superscripts represent the CCD camera number and the subscripts represent the coefficient number. The rows of the first and last matrix of Equation 8 represent values for a particular camera (e.g. row 1 is for camera 1). This matrix form represents an exactly determined system (3 equations, 3 unknowns) of the form:

$$Ap = C$$

Using Cramer's rule to solve for X, Y and Z independently gives:

$$X = \frac{\det \begin{bmatrix} (C^1 L_7^1 - L_4^1) & (L_2^1 - C^1 L_6^1) & (L_3^1 - C^1) \\ (C^2 L_7^2 - L_4^2) & (L_2^2 - C^2 L_6^2) & (L_3^2 - C^2) \\ (C^3 L_7^3 - L_4^3) & (L_2^3 - C^3 L_6^3) & (L_3^3 - C^3) \end{bmatrix}}{\det \begin{bmatrix} (L_1^1 - C^1 L_5^1) & (L_2^1 - C^1 L_6^1) & (L_3^1 - C^1) \\ (L_1^2 - C^2 L_5^2) & (L_2^2 - C^2 L_6^2) & (L_3^2 - C^2) \\ (L_1^3 - C^3 L_5^3) & (L_2^3 - C^3 L_6^3) & (L_3^3 - C^3) \end{bmatrix}} \quad (9)$$

$$Y = \frac{\det \begin{bmatrix} (L_1^1 - C^1 L_5^1) & (C^1 L_7^1 - L_4^1) & (L_3^1 - C^1) \\ (L_1^2 - C^2 L_5^2) & (C^2 L_7^2 - L_4^2) & (L_3^2 - C^2) \\ (L_1^3 - C^3 L_5^3) & (C^3 L_7^3 - L_4^3) & (L_3^3 - C^3) \end{bmatrix}}{\det \begin{bmatrix} (L_1^1 - C^1 L_5^1) & (L_2^1 - C^1 L_6^1) & (L_3^1 - C^1) \\ (L_1^2 - C^2 L_5^2) & (L_2^2 - C^2 L_6^2) & (L_3^2 - C^2) \\ (L_1^3 - C^3 L_5^3) & (L_2^3 - C^3 L_6^3) & (L_3^3 - C^3) \end{bmatrix}} \quad (10)$$

$$Z = \frac{\det \begin{bmatrix} (L_1^1 - C^1 L_5^1) & (L_2^1 - C^1 L_6^1) & (C^1 L_7^1 - L_4^1) \\ (L_1^2 - C^2 L_5^2) & (L_2^2 - C^2 L_6^2) & (C^2 L_7^2 - L_4^2) \\ (L_1^3 - C^3 L_5^3) & (L_2^3 - C^3 L_6^3) & (C^3 L_7^3 - L_4^3) \end{bmatrix}}{\det \begin{bmatrix} (L_1^1 - C^1 L_5^1) & (L_2^1 - C^1 L_6^1) & (L_3^1 - C^1) \\ (L_1^2 - C^2 L_5^2) & (L_2^2 - C^2 L_6^2) & (L_3^2 - C^2) \\ (L_1^3 - C^3 L_5^3) & (L_2^3 - C^3 L_6^3) & (L_3^3 - C^3) \end{bmatrix}} \quad (11)$$

Once XYZ values have been calculated, they can be transformed to a specified reference plane if desired. This is helpful when it is desirable to maintain a continuous position mapping, but there is need to move the camera assembly 25. If the chosen points of the reference frame are fixed (i.e. not moved), a continuous mapping can be achieved while allowing the camera system to be moved.

Transformation from the original reference plane (which in our case is the calibration reference frame used to calibrate system 11 for the particular camera system 25) to another can be accomplished by defining the reference frame then transforming by application of a rotation matrix and a translation matrix. For this system, the reference frame is defined by measuring at least 3 points (maximum of 4 points for a current implementation) of the desired reference plane.

As an additional system check, the known relative (relative to each other) positions of the LED's defining the reference frame can by used to assess gross measurement errors. In other words, the measured locations of reference points can be mapped against the known relative locations (again, relative to each other) to make sure the system is measuring within a certain tolerance. This requires knowledge of the mechanical layout of the LED's used for the reference frame.

The standard matrix form of the general transformation can be expressed as:

$$\begin{bmatrix} Xt \\ Yt \\ Zt \end{bmatrix} = \begin{bmatrix} Rxx & Ryx & Rzx \\ Rxy & Ryy & Rzy \\ Rxz & Ryz & Rzz \end{bmatrix} \begin{bmatrix} Xc \\ Yc \\ Zc \end{bmatrix} + \begin{bmatrix} Tx \\ Ty \\ Tz \end{bmatrix} \quad (12)$$

Where:

$$\begin{bmatrix} Xt \\ Yt \\ Zt \end{bmatrix} = \text{Transformed } XYZ \text{ values (i.e. the desired values)} \quad (13)$$

$$\begin{bmatrix} Rxx & Ryx & Rzx \\ Rxy & Ryy & Rzy \\ Rxz & Ryz & Rzz \end{bmatrix} = \text{Rotational Transformation Matrix}$$

$$\begin{bmatrix} Xc \\ Yc \\ Zc \end{bmatrix} = \text{Input } XYZ \text{ values}$$

$$\begin{bmatrix} Tx \\ Ty \\ Tz \end{bmatrix} = \text{Translation Matrix}$$

These later formulations 13 are used to calculate the rotation and translation matrix of measurement points, with regard to a reference frame 29 or 31. With only one reference frame, the transformation matrix is recomputed each time the probe measurement button is pressed. Essentially, the system 11 images the reference frame and the probe, computes the positions relative to the camera system 25 (and its Calibration Matrix Coordinate system), transforms the position of the reference frame into a 3D coordinate system and transforms the probe tip position into XYZ coordinates for that point in the 3D coordinate system derived from the one reference frame, using the equations discussed above. In the processing of FIG. 6, for example, this technique is used in step 117 to determine the position of point $P_i$.

Re-computing the reference frame transformation matrix each time requires the "To" and "From" points to be within view, where the To and From points are represented in general as in the following equation 14:

$$\begin{bmatrix} x \\ y \\ z \end{bmatrix}_{To} = \begin{bmatrix} \text{Transformation} \\ \text{Matrix} \end{bmatrix} \begin{bmatrix} x \\ y \\ z \end{bmatrix}_{From} \quad \text{"To" and} \quad (14)$$

"From" matrices needed to calculate Transformation Matrix

Equation 15 below shows the application of the transformation matrix to transform RF2 to RF1.

$$RF1 = T_{[RF1]}{}^{[RF2]} RF2_{[CMM]} \quad (15)$$

Where T[RF2][RF1] is the transformation matrix defined during setup, and RF2[cmm] is the measured location of RF2 in cmm coordinates (i.e. camera coordinates)

If the second reference frame is in use in processing a particular image (i.e. the first reference frame is out of view), the transformation matrix defined to transform the second reference frame into the first reference frames coordinates is applied and processing continues as it would for the first reference frame (i.e. as if for a single reference frame).

If the second reference frame is in use in processing a particular image (i.e. the first reference frame is out of view), the transformation matrix for the second reference frame 31 is recomputed each time the probe measurement button is pressed. Essentially, at step 123, the system 11 images the reference frame 31 and the probe 27, computes the positions relative to the camera system (and its Calibration fixture), transforms the position of the reference frame 31 into a 3D coordinate system and transforms the probe tip position into XYZ coordinates for that point in the 3D coordinate system derived from the second reference frame, again using the equations discussed above. The resultant coordinates are then "transformed" to the first reference frame. Further calculation or processing after this transformation step will be as if they were for a system with a single reference frame.

Thus, once the transformation matrix to transform from RF2 to RF1 is formulated, the system will automatically try to acquire first reference frame as its first choice. If this reference frame is unavailable or becomes unavailable (e.g. it goes out of view), the system will automatically search for the second reference frame and switch to using it as its reference point.

Setup processing steps include acquiring a Center Location of RF1 (29) and calculating the transform, $T_{[RF1]}$. The system then acquires the Center Location of RF2 (31) and applies the Transform, $T_{[RF1]}$. This processing will acquire (or lookup) XYZ values for RF2, then calculate the center, giving a single XYZ value. After the center XYZ values for RF2 (31) have been computed (may be in cmm or camera coordinates), the coordinates can then be transformed to RF1 by:

$$RF2_{[RF1]} = T_{[RF1]} RF2_{[cmm]}$$

Coordinate system with which it is referenced.

RF2 is now referenced to the RF1 coordinate system. The system can then compute $T^{[RF2]}{}_{[RF1]}$ which will transform values taken in relation to RF2 into values in the coordinate system derived in relation to RF1, as follows:

$$RF1_{[RF1]} = T^{[RF2]}{}_{[RF1]} RF2_{[RF1]}$$

which is of the form: $RF_{To} = T^{[RF2]}{}_{[RF1]} RF_{From}$ $T^{[RF2]}{}_{[RF1]}$ transformation matrix will then be stored and applied to RF2 immediately after its center XYZ value has been computed.

An example of the initialization process, showing somewhat more detail, appears in the flow-chart of FIG. 7. In view of the discussion above and the text included in the drawing, it is believed that the flow chart is self-explanatory.

In the above examples, the system will initially prompt the user to set the two reference frames within simultaneous view of the camera system. The system will then measure the locations of both reference frames and define a transformation matrix that will relate reference frame 2 to reference frame 1. In the examples discussed above, if the active reference frame (RF1) goes out of view (e.g. if the camera is moved where the reference frame cannot be detected), the software automatically initiates a search for the other reference frame. If the second reference frame can not be found, the software automatically initiates a systematic search for both reference frames. Anytime a reference frame is not within view, the software advises the user if the alternate can not be acquired. However, it is envisioned that the processing may extend to use one or more additional reference frames, for camera system positions in which neither the first nor the second reference frame is visible.

FIG. 8 is a view similar to that of FIG. 5 but showing use of one or more additional reference frames 129, 131. At position X, the camera system is operated and the image data processed as discussed above to define the position of the second reference frame 31 in the coordinate system of the first reference frame 29.

During operation, or as a second step in the initialization phase, the camera system 25 is moved to another position to image one of the first two reference frames and at least one of the additional reference frames. In the example, at position Y, the camera system 25 has an image view of the second reference frame 31 and the third reference frame 131. The center point of the third reference frame is computed, the relationship to the second frame is determined, and the center point is transformed into the coordinate system of the first reference frame, essentially as in the measurement of a probe position at step 123 in the process of FIG. 6. However, the transform of the third reference frame 129 can then be used to transform point measurement results into the coordinate system of the first reference frame 29, in essentially the same manner as was done with the second reference frame 31.

With three frames, the system allows approximately 270° of movement of the camera system 25 about the vehicle 13. If a fourth reference frame 131 is used, the processing is similar to that for the frame 31 or for the frame 129, depending on which of the other frames (e.g. 29 or 129) are in the field of view of the camera system 25 during the initial image processing with respect to the frame 131. With four frames, the system allows approximately 360° of movement of the camera system 25 about the vehicle 13. Additional reference frames may be used, for example, to reduce or eliminate any possible gaps in coverage.

Those skilled in the art will recognize that the present teachings may be modified or adapted in various ways to other applications. In the examples discussed above, the software of the host PC specified that the first reference frame will be used if it is within view. Those skilled in the art will recognize, for example, that selection of one or both frames may utilize an alternative approach. Those skilled in the art will also recognize that the concepts disclosed herein have wide applicability. For example, a machine vision technique such as outlined above could be implemented for other types of vehicles, e.g. airplanes, and the point measurement techniques could be used to assess characteristics other than collision damage, such as component alignment or wear.

The discussion above has focused on an example using optical 3D imaging, to measure point locations. Those skilled in the art will recognize that the multiple reference frame concepts may be adapted to systems using other 3D sensing and measurement technologies.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of optically measuring locations of a plurality of points on an object, comprising:
   mounting a first reference frame supporting at least three optical targets so as to define a first reference plane, at a first location and with a first orientation on the object;
   mounting a second reference frame supporting at least three optical targets so as to define a second reference plane independent of the first reference plane, at a second location and with a second orientation on the object, wherein the second location and the second orientation of the second reference frame are substantially independent of the location and the orientation of the first reference frame and the second reference plane is at an angle with respect to the first reference plane;
   obtaining at least one image of optical targets on both the first reference frame and the second reference frame;
   processing the at least one image to define a three-dimensional coordinate system and to determine a position of the second reference frame in the defined three-dimensional coordinate system;
   placing an optical probe target in predetermined relationship to each of the points on the object;
   obtaining at least one respective image of the optical probe target when placed in the predetermined relationship to each of the points on the object;
   processing the at least one respective image of the optical probe target when placed in the predetermined relationship to each of the points on the object to determine a position of each of the points on the object in the defined three-dimensional coordinate system, wherein:
   for a measurement of position of a first one of the points, in which the optical targets of the first reference frame are visible in a first respective image, the processing of the first respective image comprises determining position of the first point in the defined three-dimensional coordinate system;
   for a measurement of position of a second one of the points, in which less than three of the optical targets of the first reference frame are visible in a second respective image but the optical targets of the second reference frame are visible in the second respective image, the processing of the second respective image comprises determining position of the second point relative to the second reference frame and transforming the position of the second point relative to the second reference frame into position of the second point in the defined three-dimensional coordinate system based on the determined position of the second frame in the defined three-dimensional coordinate system; and
   providing at least one output based on the determined positions of the first and second points in the defined three-dimensional coordinate system.

2. The method of claim 1, wherein the object is a vehicle.

3. The method of claim 2, wherein the vehicle is a truck or automobile.

4. The method of claim 1, wherein:
   the at least one image of the optical targets on the first reference frame and the second reference frame provides three-dimensional image information; and
   each at least one respective image of the optical probe target when placed in the predetermined relationship to each of the points on the object provides three-dimensional image information.

5. The method of claim 4, wherein:
   the at least one image of the optical targets on the first reference frame and the second reference frame comprises a horizontal image and a vertical image; and
   each at least one respective image of the optical probe target when placed in the predetermined relationship to each of the points on the object comprises a horizontal image and a vertical image.

6. The method of claim 1, wherein:
   the optical targets on the first reference frame and the second reference frame comprise emitters for emitting detectable radiant energy; and
   the optical probe target comprises a plurality of emitters for emitting detectable radiant energy.

7. The method of claim 6, wherein each of the emitters comprises a light emitting diode (LED).

8. The method of claim 1, wherein at least one point on the object is a reference point for the object, and the method further comprises:
   determining a positional relationship of the reference point in the defined three-dimensional coordinate system; and
   transforming each determined position of one of the plurality of points on the object in the defined three-dimensional coordinate system into a position in a three-dimensional coordinate system for the object.

9. The method of claim 8, further comprising comparing reference data regarding locations of the plurality of points on the object to the transformed positions of the plurality of points in the three-dimensional coordinate system for the object.

10. The method of claim 1, further comprising:
    mounting a third reference frame supporting at least three optical targets so as to define a third reference plane independent of the first and second reference planes, at a third location and with a third orientation on the object, wherein the third location and the third orientation of the third reference frame are substantially independent of the locations and the orientations of the first and second reference frames;

obtaining at least one image of optical targets on the third reference frame and on one of the first and second reference frames; and processing the at least one image of optical targets on the third reference frame and on one of the first and second reference frames, to determine a position of the third reference frame with respect to the one of the first and second reference frames;

wherein for a measurement of position of a third one of the points, in which less than three of the optical targets of the first reference frame and less than three of the optical targets of the second reference frame are visible in a third respective image but the optical targets of the third reference frame are visible in the third respective image, the processing of the third respective image comprises determining position of the third point relative to the third reference frame and transforming the position of the third point relative to the third reference frame into position of the third point in the defined three-dimensional coordinate system based on the determined position of the third frame with respect to the one of the first and second reference frames.

11. A method of measuring positions of points on an object, comprising;

receiving a signal representing at least one image of optical targets on two separate reference frames mounted at independent locations on the object;

processing the signal representing at least one image to determine a three-dimensional coordinate system with respect to a first one of the reference frames and to determine a position of the second one of the reference frames in the three-dimensional coordinate system defined with respect to the first reference frame;

receiving a signal representing at least one first image of an optical probe target positioned with regard to a first point on the object and of the optical targets on the first reference frame;

processing the signal representing at least one first image of the optical probe target to determine position of the first point on the object in the three-dimensional coordinate system defined with respect to the first reference frame;

receiving a signal representing at least one second image of the optical probe target positioned with regard to a second point on the object and of the optical targets on the second reference frame, the at least one second image of the optical probe target not including all of the optical targets on the first reference frame;

processing the signal representing at least one second image of the optical probe target to determine position of the second point relative to the second reference frame;

transforming the position of the second point relative to the second reference frame into position of the second point in the three-dimensional coordinate system, based on the position of the second reference frame in the three-dimensional coordinate system; and providing at least one output based on the positions of the first point and the second point in the three-dimensional coordinate system.

12. A product comprising executable code for implementation of the method of claim 11 and a machine readable medium bearing the executable code.

13. A computer system programmed for implementation of the method of claim 11.

14. The method of claim 11, further comprising:

receiving a signal representing at least one image of optical targets on one of the two reference frames and optical targets on a separate third reference frame mounted at an independent location on the object;

processing the signal representing at least one image of the one reference frame and the third reference frame, to determine a position of the third reference frame with respect to the one reference frame;

receiving a signal representing at least one third image of the optical probe target positioned with regard to a third point on the object and of the optical targets on the third reference frame, the at least one third image of the optical probe target not including all of the optical targets on either the first reference frame or the second reference frame;

processing the signal representing at least one third image of the optical probe target to determine position of the third point relative to the third reference frame; and transforming the position of the third point relative to the third reference frame into position of the third point in the three-dimensional coordinate system, based on the position of the third reference frame with respect to the one reference frame.

15. A product comprising executable code for implementation of the method of claim 14 and a machine readable medium bearing the executable code.

16. A computer system programmed for implementation of the method of claim 14.

17. The method of claim 11, further comprising:

determining a positional relationship of reference points on the object in the three-dimensional coordinate system;

transforming the positions of the first and second points in the determined three-dimensional coordinate system into positions of the first and second points in a three-dimensional coordinate system for the object determined in relation to the reference points.

18. The method of claim 17, wherein the object is a vehicle, and the method further comprises comparing reference data regarding locations of the first and second points on the vehicle to the transformed positions of the first and second points in the three-dimensional coordinate system for the object.

19. A system for analyzing damage at points on a vehicle, comprising:

a probe for contact with the points on the vehicle to be tested for displacement due to damage of the vehicle, the probe comprising an optically detectable target;

a first reference frame comprising three optically detectable targets defining a first reference plane, and a mount for removably attaching the first reference frame to a first location on the vehicle;

a second reference frame comprising three optically detectable targets defining a second reference plane, and a mount for removably attaching the second reference frame to a second location on the vehicle separate from the first location on the vehicle and independent from mounting of the first reference frame;

a three dimensional imaging system, for generating signals representative of images; and a programmed computer responsive to image signals representing images of targets on the reference frames and image signals representing images of the target on the probe when the probe contacts points on the vehicle, for determining positions of the points on the vehicle in a three-dimensional coordinate system defined with respect to at least one of the reference frames as mounted on the vehicle.

20. The system of claim 19, wherein the three-dimensional coordinate system is defined with respect to the first reference frame as mounted at the first location on the vehicle.

21. The system of claim 20, wherein the computer is programmed to process an imaging signal representing an image of the probe in which less than three targets on the first reference frame are visible but three targets on the second reference frame are visible, to determine position of a point contacted by the probe relative to the second reference frame and transform the position relative to the second reference frame into a position in the three-dimensional coordinate system defined with respect to the first reference frame based on the position of the second reference frame in the three-dimensional coordinate system.

22. The system of claim 19, wherein the computer is further programmed to determine a three-dimensional coordinate system for the vehicle, and transform the positions of the points on the vehicle in the three-dimensional coordinate system defined with respect to at least one of the reference frames as mounted on the vehicle into positions of the points on the vehicle in the three-dimensional coordinate system for the vehicle.

23. The system of claim 22, wherein the computer is further programmed to compare reference data regarding locations of the points on the vehicle to the transformed positions of the points on the vehicle in the three-dimensional coordinate system for the vehicle.

24. A system for analyzing damage at points on a object, comprising:
  a probe for contact with the points on the object to be tested for displacement due to damage of the object, the probe comprising an optically detectable target;
  a first reference frame comprising three optically detectable targets defining a first reference plane, and a mount for removably attaching the first reference frame to a first location on the object;
  a second reference frame comprising three optically detectable targets defining a second reference plane, and a mount for removably attaching the second reference frame to a second location on the object separate from the first location on the object and independent from mounting of the first reference frame;
  a three dimensional imaging system, for generating signals representative of images; and
  means, responsive to image signals from the three dimensional imaging system, for processing a signal representing an image containing the reference frames to define a three-dimensional coordinate system with respect to at least one of the reference frames when both reference frames are mounted on the object, and for processing image signals representing images containing the probe and at least one of the reference frames to determine positions of the points in the defined three-dimensional coordinate system.

25. The system of claim 24, wherein the reference frames are configured for mounting on a vehicle type object.

26. The system of claim 25, wherein the means are further for converting positions of the points in the defined three-dimensional coordinate system into positions in a three-dimensional coordinate system defined with respect to the vehicle.

27. The system of claim 26, wherein the means are configured to facilitate comparison of the positions of the points in the three-dimensional coordinate system defined with respect to the vehicle to reference data for the positions of the points on the vehicle.

28. The system of claim 24, further comprising a third reference frame comprising three optically detectable targets defining a third reference plane, and a mount for removably attaching the third reference frame to a third location on the object separate from the first and second locations on the object and independent from mounting of the first and second reference frames.

29. The system of claim 28, further comprising a fourth reference frame comprising three optically detectable targets defining a fourth reference plane, and a mount for removably attaching the fourth reference frame to a fourth location on the object separate from the first, second and third locations on the object and independent from mounting of the first, second and third reference frames.

30. A method of optically measuring a location of a point on an object, comprising:
  mounting a first reference frame supporting at least three optical targets so as to define a first reference plane, at a first location and with a first orientation on the object;
  mounting a second reference frame supporting at least three optical targets so as to define a second reference plane independent of the first reference plane, at a second location and with a second orientation on the object, wherein the second location and the second orientation of the second reference frame are substantially independent of the location and the orientation of the first reference frame and the second reference plane is at an angle with respect to the first reference plane;
  obtaining at least one image of optical targets on both the first reference frame and the second reference frame;
  processing the at least one image to define a three-dimensional coordinate system in relation to the first reference frame and to determine a position of the second reference frame in the defined three-dimensional coordinate system;
  placing an optical probe target in predetermined relationship to the point on the object;
  obtaining at least one image of the optical probe target when placed in the predetermined relationship to the point on the object, wherein one or more of the optical targets of the first reference frame are not visible in the at least one image of the optical probe target but the optical targets of the second reference frame are visible in the at least one image of the optical probe target;
  processing the at least one image of the optical probe target to determine position of the point on the object relative to the second reference frame;
  transforming the position of the point on the object relative to the second reference frame into position of the point on the object in the defined three-dimensional coordinate system, based on the determined position of the second frame in the defined three-dimensional coordinate system; and
  providing at least one output based on the position of the point on the object in the defined three-dimensional coordinate system.

31. A method of measuring position of a point on an object, comprising;
  receiving a signal representing at least one image of optical targets on two separate reference frames mounted at independent locations on the object;

processing the signal representing at least one image to determine a three-dimensional coordinate system with respect to a first one of the reference frames and to determine a position of the second one of the reference frames in the three-dimensional coordinate system defined with respect to the first reference frame;

receiving a signal representing at least one image of an optical probe target positioned with regard to the point on the object and of the optical targets on the second reference frame, the at least one image of the optical probe target not including all of the optical targets on the first reference frame;

processing the signal representing at least one image of the optical probe target to determine position of the point relative to the second reference frame;

transforming the position of the point relative to the second reference frame into position of the point in the three-dimensional coordinate system, based on the position of the second reference frame in the three-dimensional coordinate system; and providing at least one output based on position of the point in the three-dimensional coordinate system.

32. A product comprising executable code for implementation of the method of claim 31 and a machine readable medium bearing the executable code.

33. A computer system programmed for implementation of the method of claim 31.

34. A method of measuring a location of a point on an object, comprising:

mounting a first reference frame supporting at least three targets so as to define a first reference plane, at a first location and with a first orientation on the object;

mounting a second reference frame supporting at least three targets so as to define a second reference plane independent of the first reference plane, at a second location and with a second orientation on the object, wherein the second location and the second orientation of the second reference frame are substantially independent of the location and the orientation of the first reference frame and the second reference plane is at an angle with respect to the first reference plane;

obtaining a sensing signal relating to targets on both the first reference frame and the second reference frame;

processing the sensing signal to define a three-dimensional coordinate system in relation to the first reference frame and to determine a position of the second reference frame in the defined three-dimensional coordinate system;

placing a probe target in predetermined relationship to the point on the object;

obtaining a sensing signal relating to the probe target when placed in the predetermined relationship to the point on the object, wherein one or more of the targets of the first reference frame are not identifiable in the sensing signal relating to the probe target but the targets of the second reference frame are identifiable in the sensing signal relating to the probe target;

processing the sensing signal relating to the probe target to determine position of the point on the object relative to the second reference frame;

transforming the position of the point on the object relative to the second reference frame into position of the point on the object in the defined three-dimensional coordinate system, based on the determined position of the second frame in the defined three-dimensional coordinate system; and producing at least one output based on the position of the point on the object in the defined three-dimensional coordinate system.

35. A method of measuring position of a point on an object, comprising:

receiving a sensing signal regarding targets on two separate reference frames mounted at independent locations on the object;

processing the signal to determine a three-dimensional coordinate system with respect to a first one of the reference frames and to determine a position of the second one of the reference frames in the three-dimensional coordinate system defined with respect to the first reference frame;

receiving a sensing signal regarding a probe target positioned with regard to the point on the object and of the targets on the second reference frame, the sensing signal regarding the probe target not including a representation of all of the targets on the first reference frame;

processing the sensing signal regarding the probe target to determine position of the point relative to the second reference frame;

transforming the position of the point relative to the second reference frame into position of the point in the three-dimensional coordinate system, based on the position of the second reference frame in the three-dimensional coordinate system; and providing at least one output based on the position of the point in the three-dimensional coordinate system.

36. A product comprising executable code for implementation of the method of claim 35 and a machine readable medium bearing the executable code.

37. A computer system programmed for implementation of the method of claim 35.

* * * * *